United States Patent [19]

Rae

[11] 4,394,976
[45] Jul. 26, 1983

[54] HYDRAULICALLY OPERATED PUSH-OFF MANURE SPREADER

[75] Inventor: Rory Rae, Port Colborne, Canada
[73] Assignee: Deere & Company, Moline, Ill.
[21] Appl. No.: 281,746
[22] Filed: Jul. 9, 1981
[51] Int. Cl.³ .................... A01C 15/12; A01C 15/16
[52] U.S. Cl. .................... 239/679; 108/62; 108/102; 414/513
[58] Field of Search .......... 239/670, 672, 674, 676, 239/679, 681; 414/513, 522, 523; 296/39 R; 298/1 B; 108/65, 86, 93, 102, 62, 63; 104/134

[56] References Cited

U.S. PATENT DOCUMENTS

| | | | |
|---|---|---|---|
| 2,557,003 | 6/1951 | Le Laurin | 414/513 |
| 2,602,012 | 7/1952 | Doty | 108/62 |
| 2,800,234 | 7/1957 | Herpich et al. | 414/513 |
| 2,868,398 | 1/1959 | Anderson et al. | 414/513 |
| 2,911,119 | 11/1959 | Kuhnau | 414/513 |
| 3,294,263 | 12/1966 | Naden et al. | 414/523 |
| 3,899,090 | 8/1975 | Telesio | 414/513 |
| 4,231,695 | 11/1980 | Weston, Sr. | 296/39 R |

FOREIGN PATENT DOCUMENTS 1097389  3/1981  Canada ................ 414/522

OTHER PUBLICATIONS

Fahr Literature (Germany).

*Primary Examiner*—John J. Love
*Assistant Examiner*—Michael J. Forman

[57] ABSTRACT

A push-off type manure spreader has the floor of the spreader composed of a front and rear portion with the front portion sliding rearwardly over and on the rear portion. A push-off is provided to move material from the front to the rear ends of the front floor portion. The rear portion is encased within a plastic cover and rails are provided on the rear floor portion that engage pads on the front or upper floor portion to hold the underside of the front portion out of engagement with the plastic surface on the rear portion.

6 Claims, 5 Drawing Figures

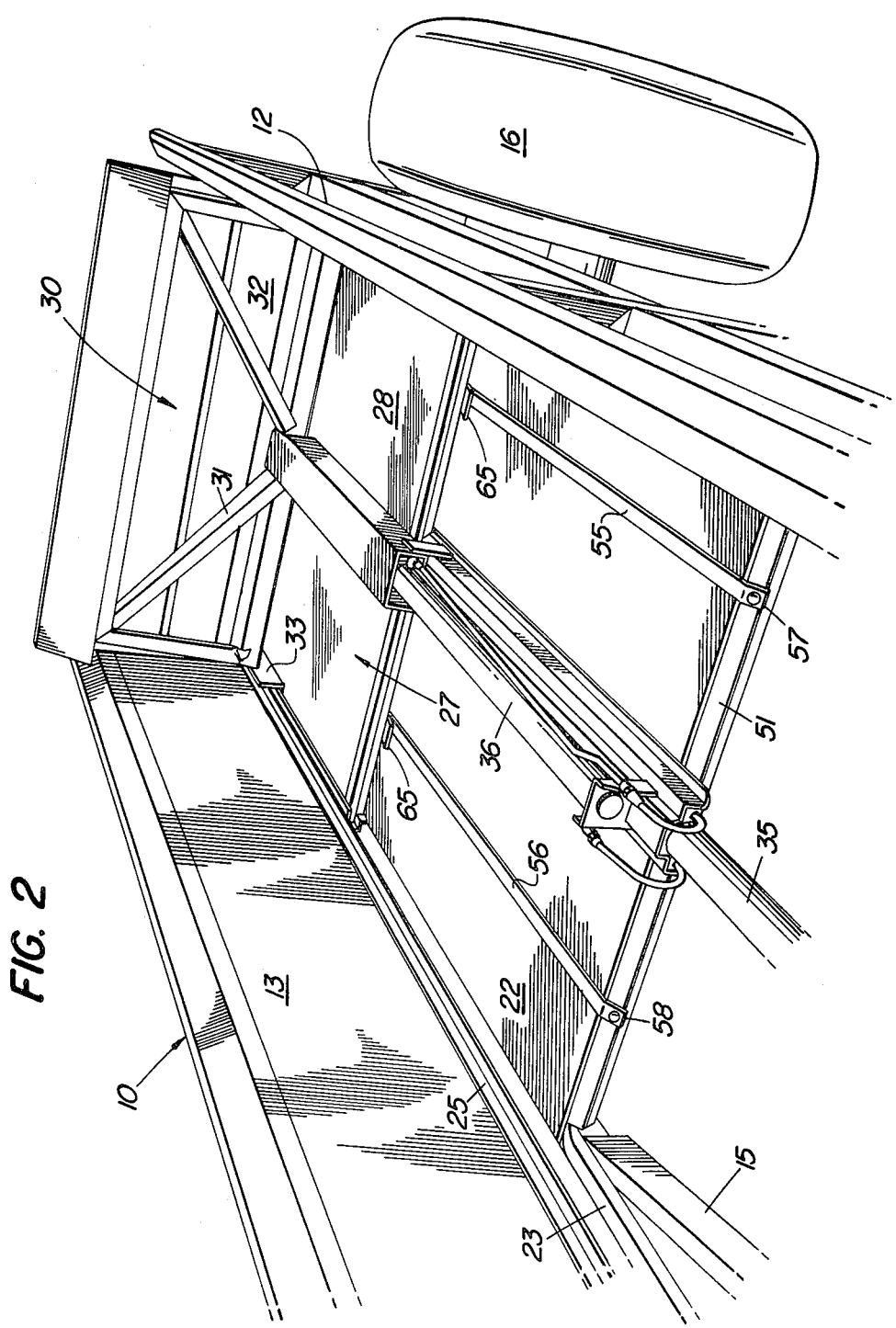

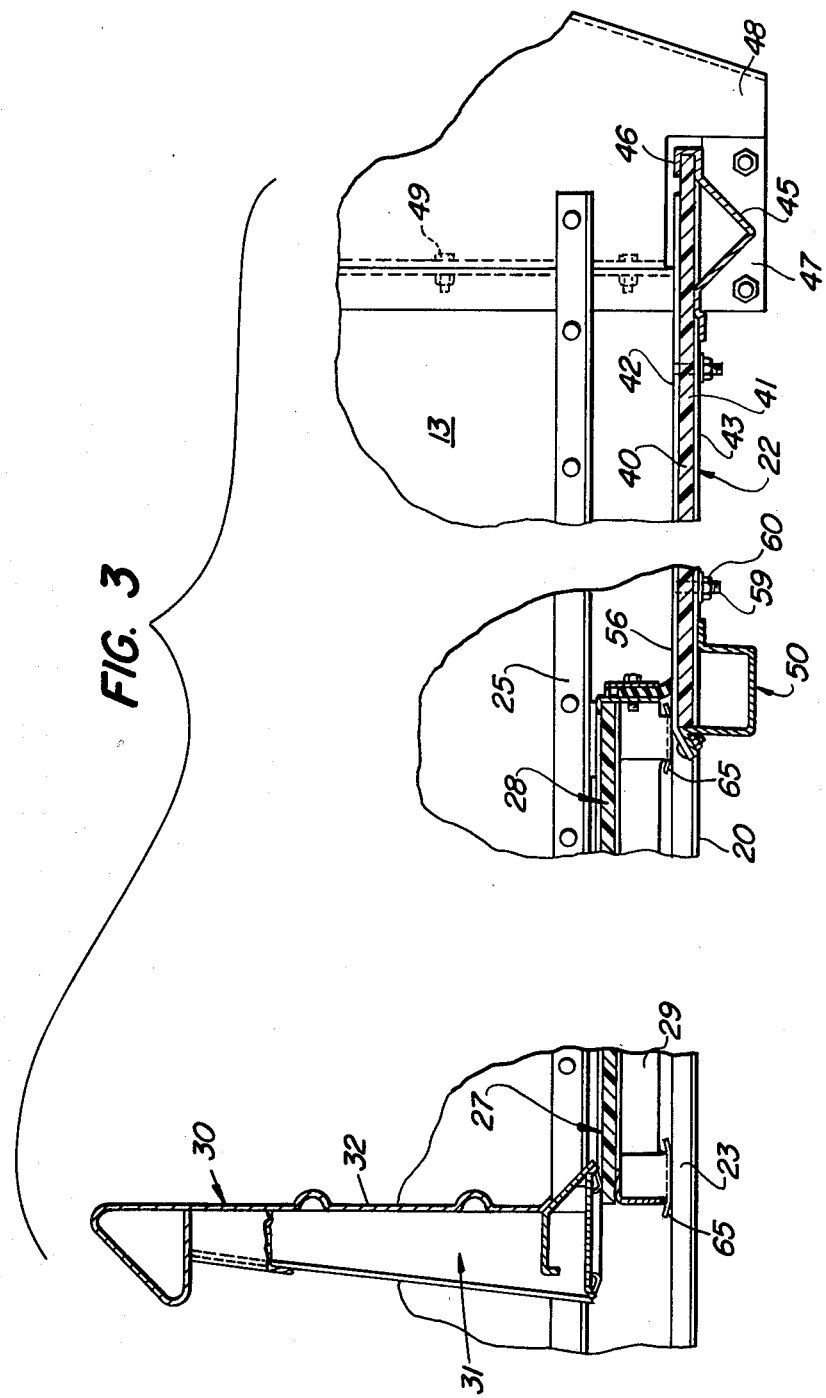

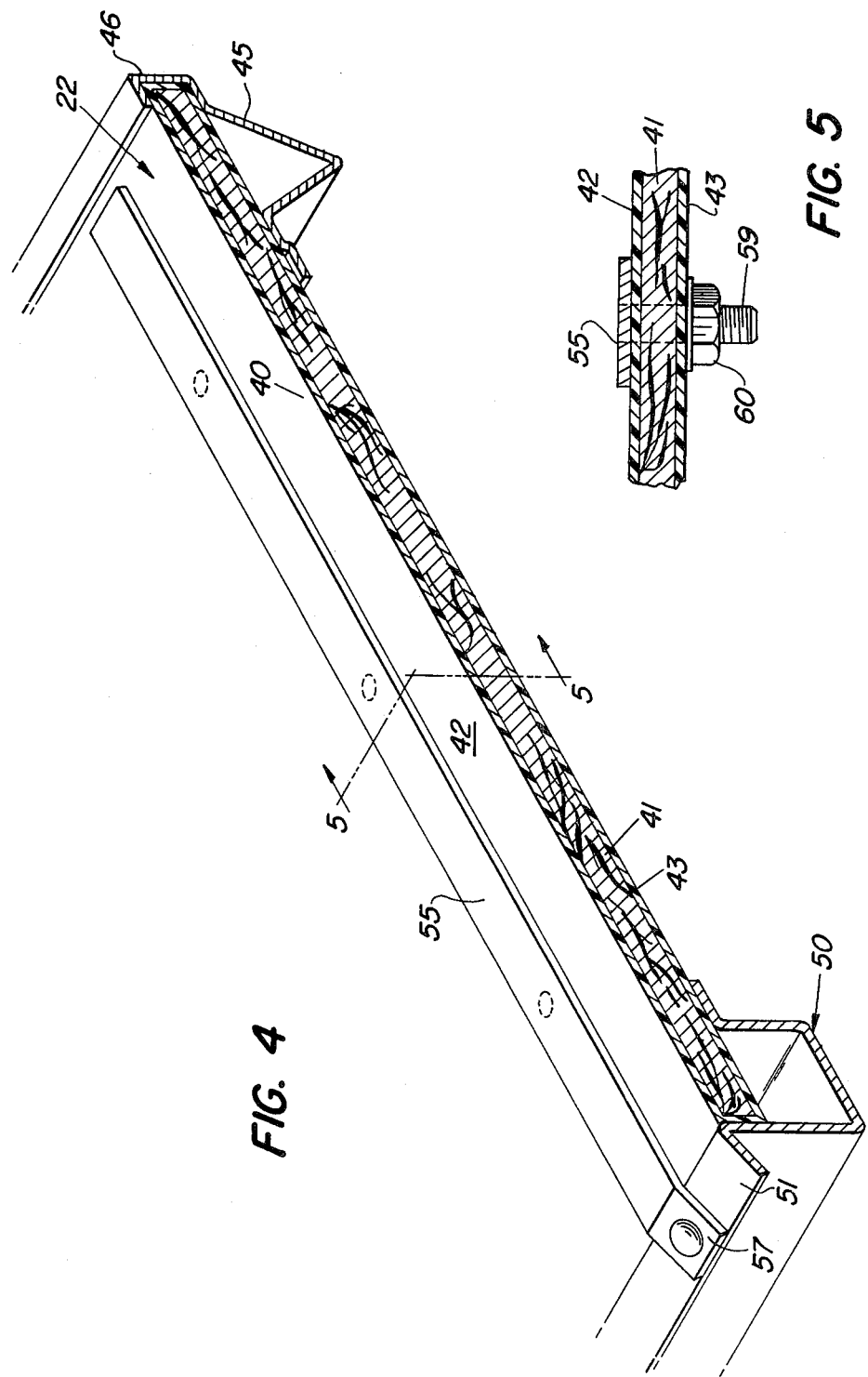

HYDRAULICALLY OPERATED PUSH-OFF MANURE SPREADER

BACKGROUND OF THE INVENTION

In U.S. Pat. No. 4,220,280, there is shown and described a manure spreader having a spreader box that is open at its rear end and in which the vertical side walls are connected by a floor composed of front and rear horizontal portions. The front portion is adapted to move rearwardly on the rear portion to a completely overlying position. A vertical push-off is provided to move rearwardly on the front portion. Consequently, in moving animal waste in the box to the open rear end of the spreader box, the material supported on the front floor portion is shifted rearwardly along with the push-off. The material on the front floor operates to move the material contained on the rear floor portion into the beaters at the rear end of the spreader box. Thereafter, when the front floor portion is in overlying relation to the rear floor portion, the push-off is operated to push the material off the front portion and into the beaters.

In such an arrangement as above described, it has been found necessary to provide, on the side walls and on the upper surfaces of the floor portions, plastic layers that are normally bonded to the underlying plywood or wood fiber boards. The plastic provides a smooth polished surface so that the animal waste contained in the box may more easily slide to the rear end of the box.

One of the problems that has been encountered in providing such a push-off type spreader is that the front floor portion carries considerable load when it moves rearwardly over the rear floor portion. Also, as the material on the front floor portion pushes against the material on the rear floor portion, there is additional weight added to the front portion and also a downward force component applied by the material on the rear portion to the front portion. This, of course, creates a considerable wear condition between the underside of the front portion and the upper side of the rear portion as the front portion moves rearwardly over the rear portion. Since the plastic layer is relatively thin, scouring and scratching of that surface often will penetrate completely through the layer so that the acidic parts of animal waste will penetrate into the plywood or the fibrous face of the rear floor portion. Once penetrated through the plastic surface, deterioration of the entire floor portion progresses rapidly.

SUMMARY OF THE INVENTION

With the above in mind, it is the primary purpose of the present invention to provide a plurality of fore-and-aft extending parallel plates or rails that may be bolted or otherwise detachably mounted on the rear floor portion and which extend substantially the full length of the floor portion. Cooperating with these relatively flat plates or rails are small pads fixed to the under surface of the front floor portion, adjacent the front and rear edges of the front floor portion. The rails and pads are relatively thin, but cooperate to provide a spacing between the lower surface of the front floor portion and the upper surface of the rear floor portion so as to reduce scouring or scratching of the plastic layer on the upper surface of the rear floor portion upon the front portion being shifted.

It is a further object of the present invention to provide the rear floor portion with upper and lower surfaces that have respective layers of plastic and to provide that as one upper surface of the rear floor portion deteriorates, the rear portion may be removed and reversed so that the previous lower surface becomes the upper surface. The provision that the rails or plates may be detachably mounted permits the reattachment of the rails when the floor is reversed.

BRIEF DESCRIPTION OF THE DRAWINGS

FIG. 2 is a perspective view taken from the front and showing the rear portion of the spreader when the push-off and front floor portions are moved to their rear positions.

FIG. 3 is a section view taken substantially along the line 3—3 of FIG. 1.

FIG. 4 is a perspective sectional view of one of the rear floor portions taken along a fore-and-aft vertical plane.

FIG. 5 is an enlarged sectional view taken substantially along the line 5—5 of FIG. 4.

DESCRIPTION OF THE PREFERRED EMBODIMENT

Figure 1:
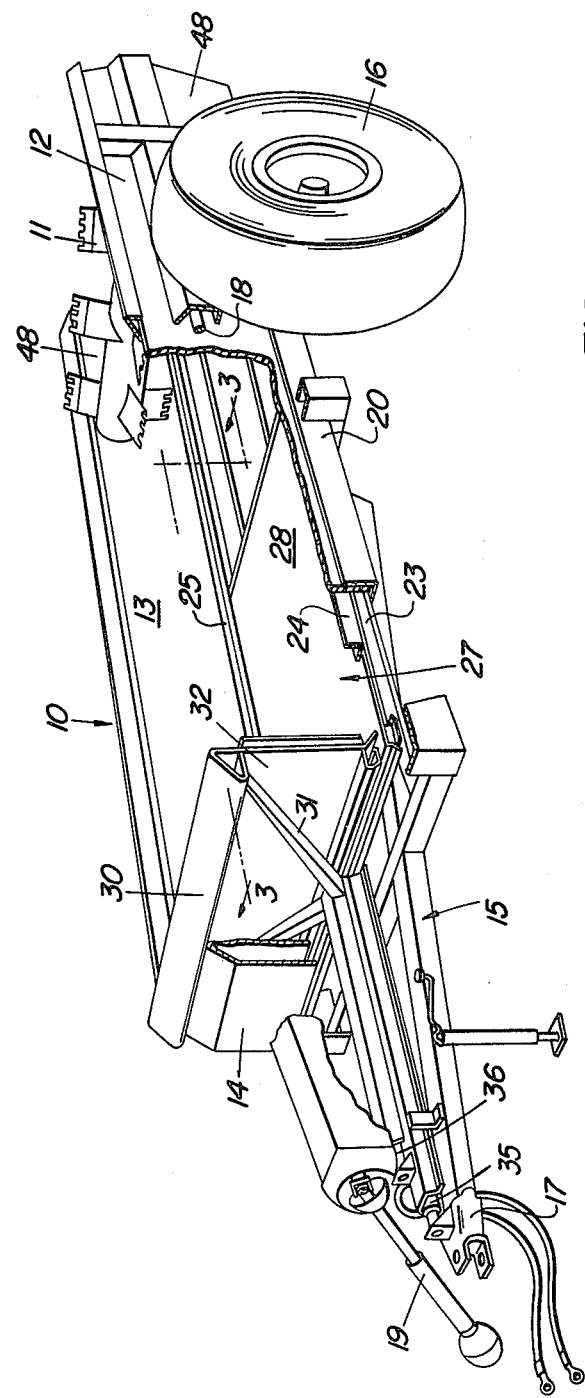
FIG. 1 is a perspective view taken from the front and the side of the manure spreader. Portions of the walls of the spreader box are removed to more clearly show internal construction of the spreader.

Referring now to FIGS. 1 and 2, the implement is composed of a box-like structure 10 open at its rear end for discharging material and has a beater mechanism indicated in its entirety by the reference numeral 11. The box 10 is composed of a pair of fore-and-aft extending upright side walls 12, 13 connected at their forward ends by a transverse front wall 14. Suitable framework 15 is carried on a pair of transport wheels, one of which is shown at 16. The framework 15 extends forwardly of the box 10 and is provided at its forward end with a drawbar connection 17 that is used to connect the spreader to a tractor. The beater mechanism 11 receives power from a beater drive shaft 18, supported on the left wall 12, and is connected through a suitable right-angle drive, not shown, extending around the forward end of the implement to a power shaft 19. The shaft 19 is adaptable for connection to the power take-off shaft of a tractor.

The framework 15 includes a pair of outer fore-and-aft extending angle-iron members, one being shown at 20, which extend the full length of the spreader box and serve as the basic support for the respective side walls 12, 13. The lower edges of the respective sides 12, 13 are supported on the horizontal flanges of the side beams or angle-irons 20. The horizontal flanges of the frame beams 20 also carry or support, at the rear end portion thereof, a fixed floor portion 22. As may best be seen from viewing FIG. 2, the rear floor portion 22 terminates at its front transverse end midway between the front and the rear ends of the spreader box. Just forwardly of the front transverse edge of the floor portion 22, there is provided, also through support on the horizontal flanges of the beams 20, a pair of fore-and-aft extending wooden rails 23 which have their upper horizontal surfaces in a general continuation with the upper surface of the rear floor portion 22. Extending substantially the full fore-and-aft length of the manure spreader box 10 and on the respective walls 12, 13 is a pair of angle-iron members 24, 25 that have their horizontal flanges extending inwardly from the respective walls 12, 13. The angle-iron members are fixed by bolting or riveting to the respective side walls. The horizontal flanges of the angle-iron members 24, 25 are spaced from the upper surface of the rear floor portion 22 and also vertically from the upper surface from the guides or rails 23. The horizontal flange portions of the angle-iron members 24, 25 and the upper surfaces of the floor 22 and rails 23 form tracks, substantially the full length of the spreader, that receive opposite fore-and-aft extending edges of a movable upper floor 27. The upper floor portion 27 is composed of an upper horizontal board-type member 28 carried on a rectangular-shaped framework, indicated in its entirety by the reference numeral 29. The framework 29 depends from the lower surface of the board member 28 and has front and rear transverse frame members that extend substantially the full transverse width of the spreader and which fit with the board in the tracks formed by the floor portion 22, the guides 23 and the flanges of the two channels or angle-irons 24, 25.

Supported to shift fore-and-aft with respect to the upper or front floor member 27 is a vertically disposed and transversely extending push-off wall 30. The push-off wall 30 is composed of a front upright frame structure 31 with a vertical wall 32 fixed thereto. The frame structure 31 has, at its lower and transverse opposite ends, a pair of fore-and-aft extending angle-iron members or beams 33 that have their horizontal flange portions projecting outwardly and under the horizontal flange portions of the angle-iron beams 24, 25. Thus, as the push-off 30 is adjusted fore-and-aft with respect to the floor surface 27, the upper surface of the floor portion 27 and the horizontal flanges of the beams 24, 25 serve as guides for the push-off 30.

Power means are provided that include a pair of hydraulic cylinders, shown at 35, 36, that move in sequence for purposes of unloading the spreader, the floor portion 27 rearwardly into an overlying position with respect to the floor portion 22 and thereafter, the push-off structure 30 rearwardly with respect to the floor portion 27.

Generally, the manure spreader, described to the present point, is similar to that shown and described in the aforementioned U.S. Pat. No. 4,220,280. Should details of the hydraulic system and any other details with respect to the overall structure be desired, such may be had by reference to this patent.

Referring now primarily to FIGS. 3, 4, and 5, the rear floor structure 22 is composed of a floorboard 40 that has a laminated fibrous board base member or core 41 that is completely encased on its upper and lower surfaces by plastic layers 42, 43 and at all its edges by similar layers of plastic which prevent moisture and other foreign matter from entering into the fibrous board 41. The foreboard 40 is carried at its rearward-most end by a transverse V-shaped channel 45, the latter having formed in its rearmost leg portion a forwardly opening U-shaped channel 46 that receives the rearmost edge of the floorboard 40. Opposite ends of the V-shaped channel 45 are welded, or otherwise fixed, to vertically extending plates 47 that are inboard of opposite upright side wall extensions 48 and which carry the opposite ends of the beater mechanism 11. The extensions 48 are bolted at 49 to the respective side walls 12, 13, as are the plates 47 to the wall extensions 48. Thus, the entire wall extensions 48 and V-shaped channel may be removed from the rearmost edge of the floorboard 22.

The forward transverse edge portion of the floorboard 40 is supported on a U-shaped channel 50 that has a forward, downwardly extending lip 51 extending from the upper surface 42 of the floorhead 40. Positioned on the rear floor portion 22 are a pair of parallel fore-and-aft extending metal rails or straps 55, 56. The straps 55, 56 have downwardly projecting end flanges 57, 58 that are bolted or otherwise fixed to the lip 51. Each of the straps 55, 56 have downwardly projecting threaded studs 59 that extend through stud openings in the floorboard 22 and are held on the upper surface 42 by nut members 60. As can best be seen from viewing FIG. 2, the rails 55, 56 are equally spaced from their respective outer edges of the floorboard 40. Thus, should it be desirable to turn the floorboard 40 over when one side becomes scoured, scratched or worn, the rails or straps 55 may be removed and replaced without difficulty. Aligned with and supported on the underside of the movable upper floor portion 27, and at the front and rear edges thereof, are four pads or shoes 65 that are vertically aligned with and engage the upper surfaces of the respective rails 55, 56. The vertical depths of the rails 55, 56 are such as to retain the structural members or the framework 29 of the upper floor portion 27 from engagement with the upper surface 42 of the floorboard 40. The shoes are high carbon, resistant steel while the rails 55, 56 are low carbon steel. This meterial difference prevents galling, yet exhibits acceptable wear life as the shoes move along the rails.

In normal operation of the spreader, the animal waste is loaded into the spreader box when the front floor structure 27 is in its front extended position with respect to the rear floor structure 22. Animal waste is filled throughout the entire box. Thus, the front floor portion carries a heavy load and upon extension of its cylinder 35, the material on the front floor portion 27 is not only retained thereon, but as it pushes against the material contained on the rear floor portion 22, it is further loaded with such material and also, there is additional downward pressure created by the material on the rear floor portion. Thus, unless otherwise provided for, there would be heavy vertical loads created between the upper or front floor portion 27 and the fixed floor portion 22 as the front portion is moved rearwardly into overlying position with the rear portion. Preventing scouring and scratching of the rear floor portion are the small pads or shoes 65 that engage the respective rails 55, 56. The two steel rails 55, 56 can resist the high abrasion of the shoes 65. Yet, they are narrow enough to not allow material freezing and buildup. Therefore, the rear floor portion 22 can provide the non-sticking, non-freezing features of the upper plastic layer 42 and yet exhibit adequate wear life. It is necessary that the plastic layer on the upper surface of the floorboard 40 be retained in order that the animal waste can slide in a relatively smooth and minimum-friction condition along the surface. For this reason, the rails and their respective pads serve the purpose of not only reducing the load required on the cylinder 35 in order to move the front floor, but they also serve as relatively thin rails or tracks on which the entire load may move without portions of the upper floor portion engaging the plastic surface.

Should the upper surface of the floorboard 40 eventually become worn, scoured, or otherwise damaged, the bolts 49 mounting the rear wall extensions 48 may be removed and the V-shaped channel 45, and its channel 46, be slid from the rear edge of the floorboard 40.

Then, by removing the bolts holding the front end rails or straps 55, 56, on the lip 51 and removing the nuts 60, the entire floorboard 40 may be slid rearwardly and reversed so that the previous downside is in the up position. Since the tracks or rails 55, 56 are the same distance from the respective edges, the rails or tracks may again be inserted on the floorboard, bolted thereto, and be in alignment with shoes 65. The lip 51 and the downwardly extending flanges 57, 58 serve to insure that, if necessary, the respective pads or shoes 65 may contact the flanges 57, 58 and be guided to their correct vertical position as the front and upper floor portion 47 moves over the rear floor portion 22. This would occur, of course, only under extreme load conditions or due to abnormal wear or damage to the spreader.

I claim:

1. In a manure spreader having a box open at its rear end for discharge of animal waste contained therein, said box having vertically disposed side walls extending lengthwise of the box with inwardly opening fore-and-aft extending tracks, said box further having a floor structure extending between the lower edges of the side walls with opposite fore-and-aft extending edges seated respectively in the tracks, the floor structure being composed of a rear lower horizontal portion fixed to the rear part of the box, and an upper horizontal portion supported to move lengthwise of the box from a front extension of the rear portion to a rear overlying relation to the rear portion and slidably carried on the latter, said floor portions having upper plastic surfaces so that animal waste may slide easily between the respective front and rear edges of the floor portions, a vertically extending push-off supported to shift lengthwise of the front floor portion between its front and rear ends; power means on the spreader for shifting, in sequence, the front floor portion rearwardly on the rear floor portion to its overlying position and thereafter the push-off rearwardly with respect to the front portion to the latter's rear edge; transversely spaced parallel and fore-and-aft extending rails mounted on the upper surface of the rear floor portion, and pads engaging said rails mounted on the underside of the front floor portion at its front and rear edges and cooperating with the rails to retain the underside of the front portion out of engagement with the upper plastic surface of the rear floor portion as it moves between its front extension and overlying positions with respect to the rear floor portion.

2. The invention described in claim 1 further characterized by a part defining a downwardly inclined transverse lip extending from the upper surface of the rear floor portion at its forward transverse edge, and the rails are elongated flat metal straps fixed to project from the upper surface of the rear floor portion and having forward ends extending downwardly over the lip.

3. The invention described in claim 1 in which the lip is of a part separate and distinct from the rear floor portion, the rear floor portion has upper and lower horizontal surfaces with plastic layers thereon, and characterized by the rear floor portion having plastic layers on both of its sides, means supporting the rear floor portion on the side walls so that it may be turned over for purposes of reversing the upper and lower surfaces, and the strips are mounted on the floor by means that permit the strips to be removed on the side of the rear floor portion and placed on the other side when the floor portion is turned over.

4. The invention described in claim 1 in which both the upper and lower surfaces of the floor structure have an external plastic layer, means mounting the rear portion on the box so that either of the surfaces may face upwardly, said rails have downwardly projecting lugs that extend through stud openings in the floor portion, and said rails are equally spaced from fore-and-aft extending side edges of the floor portion, so that upon reversal of the rear floor portion, said lugs on said rails may be reinserted into the lug openings and shall be in substantially the same fore-and-aft alignment with the pads on the upper floor portion.

5. In a manure spreader having a box open at its rear end for discharge of animal waste contained therein, said box having vertically disposed side walls extending lengthwise of the box with inwardly opening fore-and-aft extending tracks, said box further having a floor structure extending between the lower edges of the side walls with opposite fore-and-aft extending edges seated respectively in the tracks, the floor structure being composed of a rear lower horizontal portion having opposite surfaces, means mounting the rear lower portion mounted on the rear part of the box so that either of said opposite surfaces may face upwardly, and an upper horizontal portion supported to move lengthwise of the box from a front extension of the rear portion to a rear overlying relation to the rear portion and slidably carried on the latter, said floor portions having upper plastic surfaces so that animal waste may slide easily between the respective front and rear edges of the floor portions, a vertically extending push-off supported to shift lengthwise of the front floor portion between its front and rear ends; power means on the spreader for shifting the front floor portion rearwardly on the rear floor portion to its overlying position and the push-off rearwardly with respect to the front portion to the latter's rear edge; and transversely spaced parallel and fore-and-aft extending rails mounted on the upper surface of the rear floor portion and engaging the underside of the front floor portion for retaining the underside of the front portion out of engagement with the upper plastic surface of the rear floor portion as it moves between its front extension and overlying positions with respect to the rear floor portion.

6. In a manure spreader having a box open at its rear end for discharge of animal waste contained therein, said box having a floor structure composed of a rear lower horizontal portion at the rear part of the box, and a front upper horizontal portion supported at its opposite fore-and-aft extending edges to move lengthwise of the box from a front extension of the rear portion to a rear overlying relation to the rear portion, said rear floor portion having an upper plastic surface so that animal waste may slide easily thereover as the forward portion moves rearwardly; transversely spaced parallel and fore-and-aft extending rails mounted on the upper surface of the rear four portion transversely inwardly respectively of said fore-and-aft extending edges of said front floor portion and engaging the underside of the front floor portion for retaining the underside of the front portion out of engagement with the upper plastic surface of the rear floor portion as it moves between its front extension and overlying positions with respect to the rear floor portion, a transverse vertically extending push-off supported to shift lengthwise of the front portion; and power means for shifting the front portion relative to the rear portion and the push-off relative to the front portion.

\* \* \* \* \*

UNITED STATES PATENT AND TRADEMARK OFFICE
CERTIFICATE OF CORRECTION

PATENT NO. : 4,394,976

DATED : 26 July 1983

INVENTOR(S) : Rory Rae

It is certified that error appears in the above-identified patent and that said Letters Patent is hereby corrected as shown below:

Column 6, line 56, delete "four" and insert -- floor --.

Signed and Sealed this

Twenty-second Day of November 1983

[SEAL]

Attest:

GERALD J. MOSSINGHOFF

Attesting Officer    Commissioner of Patents and Trademarks